Figure 1:
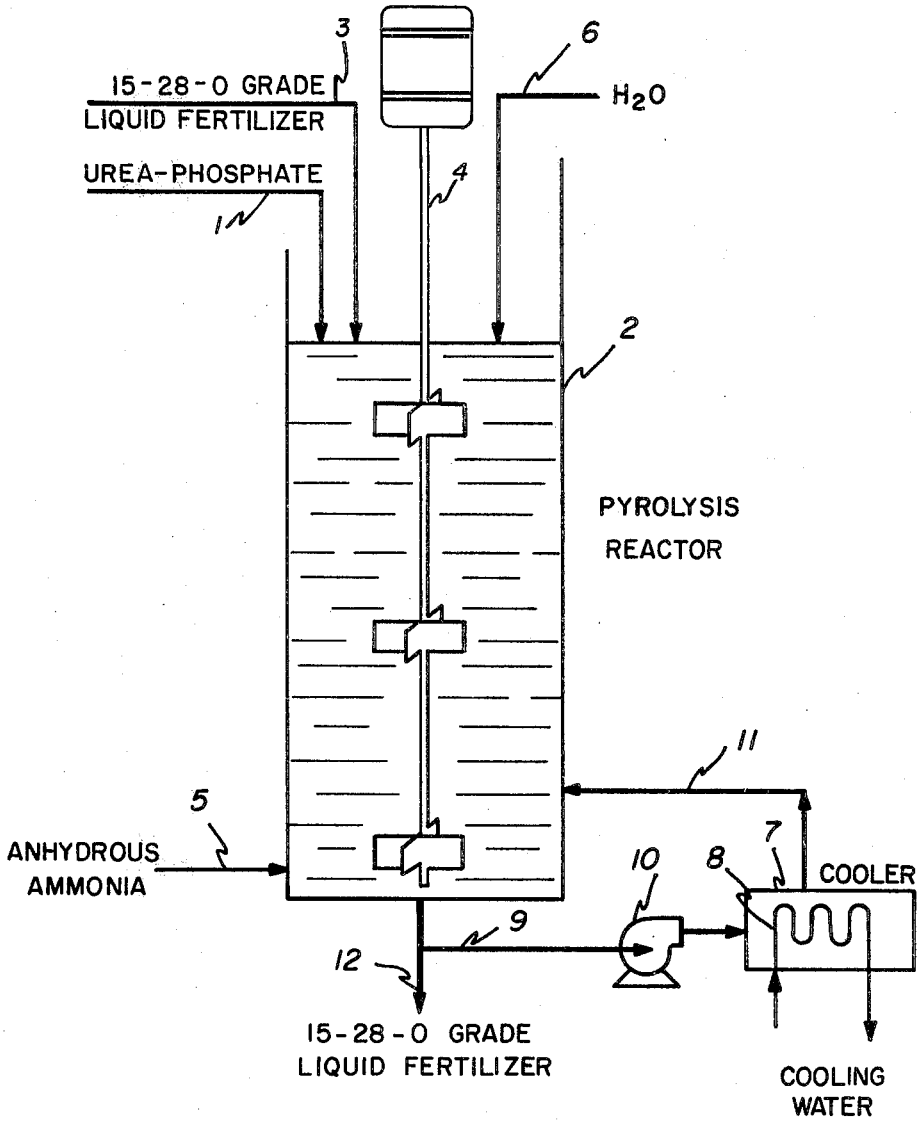
Figure 2:
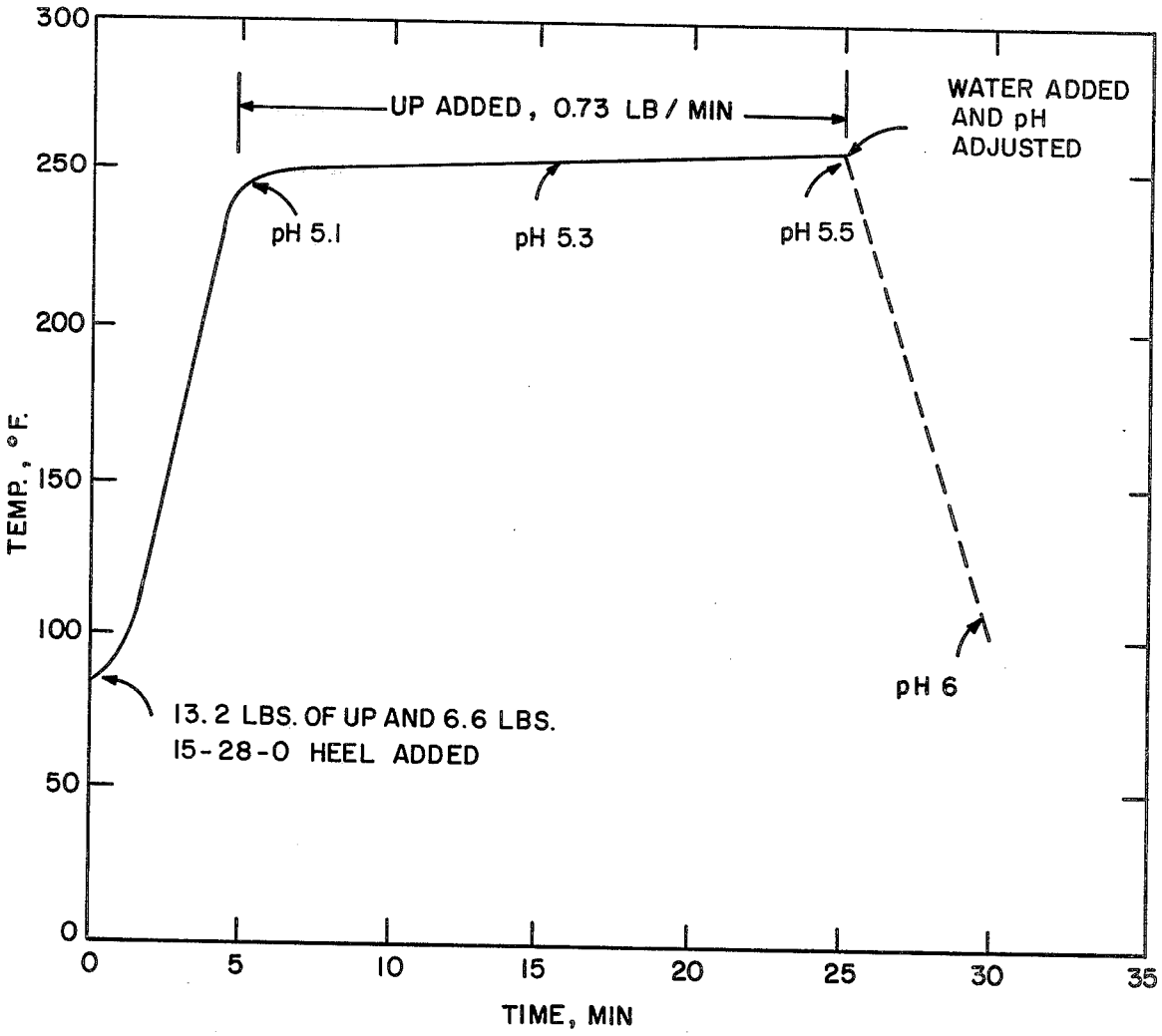
Figure 3:
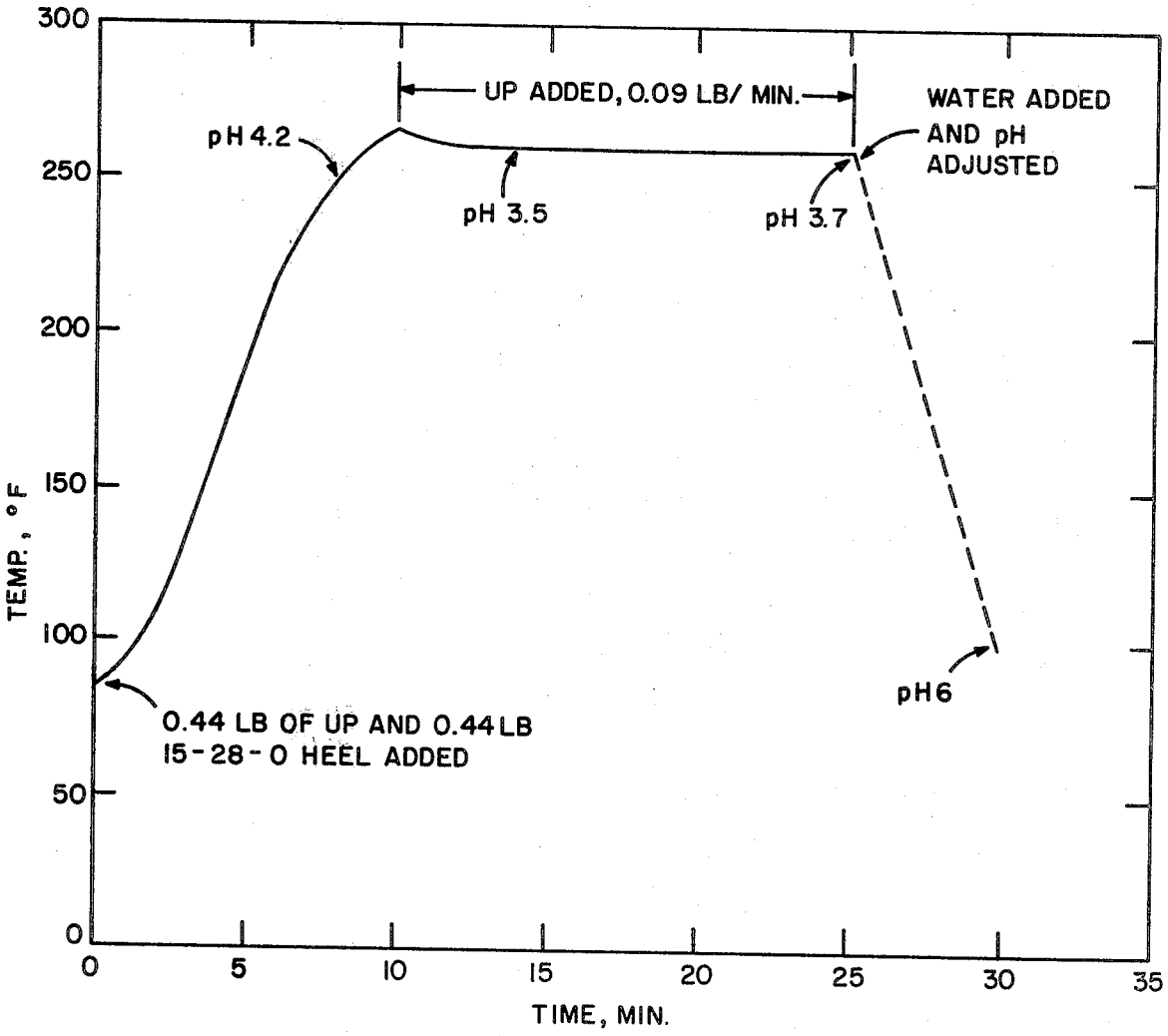

United States Defensive Publication [19] (H) [11] T998,001

Stinson et al. [43] Sep. 2, 1980

[54] PRODUCTION OF UREA-AMMONIUM POLYPHOSPHATES FROM UREA PHOSPHATE

[75] Inventors: John M. Stinson, Sheffield; James R. Burnell, Killen, both of Ala.

[73] Assignee: Tennessee Valley Authority

[21] Appl. No.: 71,436

[22] Filed: Aug. 31, 1979

[51] Int. Cl.[3] ..... C05B 13/00; C05C 9/00

[52] U.S. Cl. ..... 71/29; 71/64 C; 260/555 R; 423/315

[57] ABSTRACT

A batch process is disclosed for the production of relatively pure urea ammonium polyphosphate liquid fertilizers from crystalline urea phosphate made from wet-process acid and urea. Initially, crystalline urea phosphate is fed to a tank where it is combined with previously produced liquid product; the latter is added to provide fluidity for agitation. The mixture is then ammoniated batchwise in one stage to pyrolyze the urea phosphate to condense orthophosphate to polyphosphate and form molten urea-ammonium polyphosphates. Pyrolysis takes place at relatively low temperatures of 220° F. to 300° F. and heat from ammoniation of the urea phosphate crystals provides all the heat to effect the condensation. The molten pyrolyzate which contains mixtures of urea, ammonium orthophosphate, and ammonium polyphosphate is dissolved in an ammonia-water mixture to yield high-analysis liquid fertilizer that contains 10 to 15 percent nitrogen and 16 to 30 percent $P_2O_5$; 10 to 50 percent of the phosphate is present as polyphosphate. The liquid fertilizer is then cooled. Supplementary micronutrient-containing materials may be incorporated in the liquid product. Total batch cycle time varies from about 20 to 45 minutes.

12 Claims, 3 Sheets Drawing,

33 Pages Specification

The file of this unexamined application may be inspected and copies thereof may be purchased (849 O.G. 1221, Apr. 9, 1968).

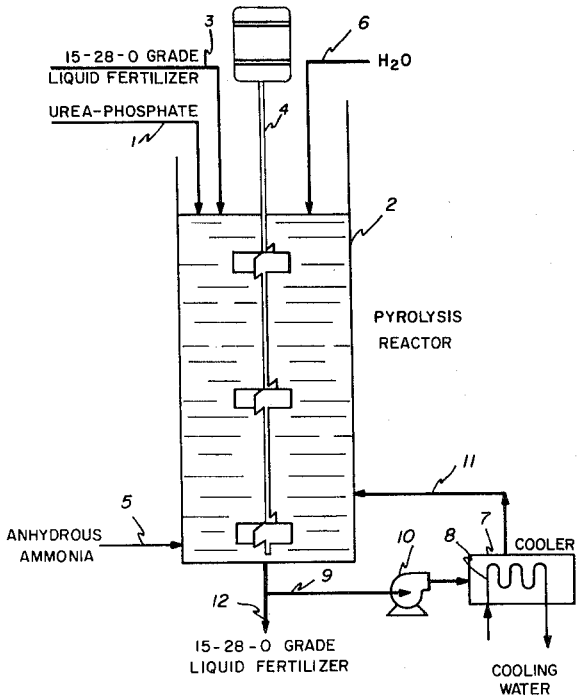

BATCH PRODUCTION OF UREA-AMMONIUM POLYPHOSPHATES FROM UREA- PHOSPHATE

BATCH PRODUCTION OF UREA-AMMONIUM POLYPHOSPHATES
FROM UREA-PHOSPHATE

TIME AND TEMPERATURE RELATIONSHIP IN TESTS OF BATCH-CONTINUOUS PYROLYSIS OF UREA PHOSPHATE-- ALL HEAT PROVIDED FROM AMMONIATION

TIME AND TEMPERATURE RELATIONSHIP IN TESTS OF BATCH - CONTINUOUS PYROLYSIS OF UREA PHOSPHATE -- ALL HEAT PROVIDED FROM AMMONIATION